Figure 1:
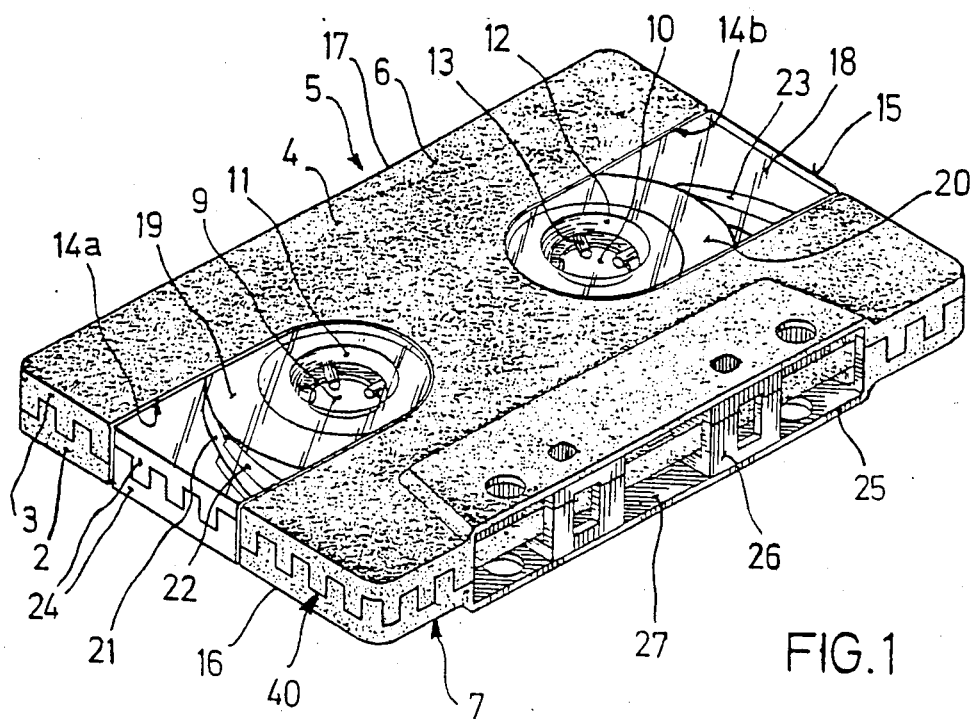

United States Patent [19]

Bettinger et al.

[11] Patent Number: 4,566,653
[45] Date of Patent: Jan. 28, 1986

[54] TAPE CASSETTE COMPRISING A SUBSTANTIALLY RECTANGULAR TWO-PART HOUSING

[75] Inventors: Guenter Bettinger, Schifferstadt; Dietmar Pfefferkorn, Hemsbach; Bozidar Pavelka, Willstaett, all of Fed. Rep. of Germany

[73] Assignee: BASF Aktiengesellschaft, Ludwigshafen, Fed. Rep. of Germany

[21] Appl. No.: 543,061

[22] Filed: Oct. 18, 1983

[30] Foreign Application Priority Data

Oct. 20, 1982 [DE] Fed. Rep. of Germany ... 8229387[U]

[51] Int. Cl.⁴ .......................... G03B 1/04; G11B 15/32
[52] U.S. Cl. ..................................... 242/199; 220/4 B
[58] Field of Search .............................. 242/197–200, 242/55.19 A; 360/132, 137; 206/387, 389, 403, 404, 448, 550; 220/1 A, 4 B, 4 E

[56] References Cited

U.S. PATENT DOCUMENTS

| 3,432,111 | 3/1969 | Ryder ................................. 242/199 |
| 3,908,852 | 9/1975 | Ricobene et al. .................. 206/550 |
| 4,012,011 | 3/1977 | Saito ................................... 242/199 |
| 4,056,235 | 11/1977 | Roe et al. .......................... 220/4 E |
| 4,076,186 | 2/1978 | Oishi et al. ........................ 242/199 |
| 4,287,990 | 9/1981 | Kurick ............................... 206/448 |

FOREIGN PATENT DOCUMENTS

| 2460855 | 3/1981 | France ............................... 220/4 B |
| 1077880 | 8/1967 | United Kingdom ............... 220/4 E |

Primary Examiner—Leonard D. Christian
Attorney, Agent, or Firm—Keil & Weinkauf

[57] ABSTRACT

A tape cassette is provided with interlocking wall sections to protect it against mechanical and/or thermal deformation. Advantageous interlocking connecting means are stepped teeth, peg-and-hole connections and connections in the form of prism-shaped projections and matching recesses.

Such interlocking connecting systems can be used with particular advantage in film, audio, video and data cassettes and all kinds of storage containers which are required to exhibit great flexural strength.

2 Claims, 7 Drawing Figures

TAPE CASSETTE COMPRISING A SUBSTANTIALLY RECTANGULAR TWO-PART HOUSING

The present invention relates to a tape cassette comprising an essentially right parallelepipedic, two-part housing which has a bottom wall, a top wall, a front wall with apertures for scanning means, and side walls and a rear wall, the front wall, the rear wall and the side walls consisting of wall sections which are at right angles to the bottom and top walls and partially or completely abut one another to form a joint.

For the purposes of the present invention, tape cassettes are all containers which contain tape- or strip-like materials, e.g. film cassettes, magnetic tape cassettes and punched tape cassettes, particularly those in which the cassette walls have a tape- or strip-guiding function.

U.S. Pat. No. 4,012,011 discloses a magnetic tape cassette with narrow frame portions which define the exposure ports in the front wall and consist of pairs of abutting sections which differ in length and form gaps which extend in a direction different from the direction of tape motion in order to prevent jamming of the tape.

U.S. Pat. No. 4,076,186 discloses another magnetic tape cassette wherein, in order to make the housing more rigid, slots and mating insert tabs are provided on the side walls and the rear wall. These slots and tabs extend exclusively along the respective cassette walls, and have an approximately rectangular shape. In one embodiment, the two side walls and the rear wall are provided with five slot-and-tab connections, so that large sections of the peripheral walls are left without stiffening means. In another embodiment, the tabs and slots are positioned along three peripheral edges of the cassette, and are substantially continuous along said edges.

It is an object of the present invention to further increase the flexural strength and torsional rigidity of a tape cassette, in particular by means of interlocking connections which are simpler to manufacture and fit together.

We have found that this object is achieved, in accordance with the invention, with a tape cassette of the type described at the outset, wherein at least the wall sections forming the rear wall comprise interlocking connecting means which are integral with the housing parts.

In a further embodiment of the cassette, the side walls are also formed by interlocking wall sections. As a result, the tape cassette has much greater resistance to all flexural and/or torsional forces which may arise during handling outside the apparatus or during operation in the apparatus, for example those forces produced by special cassette holders.

Advantageously, the front wall also comprises interlocking wall sections; this design prevents the occurrence of recording errors and playback errors usually caused by deformation of the housing.

In practical embodiment, the interlocking connecting means are in the form of teeth which are arranged in staggered relationship and extend substantially continuously along all wall sections; this design provides the greatest protection against mechanical deformation of the cassette and/or deformation due to changes in temperature.

The invention also relates to practical embodiments of the interlocking connecting means, for example stepped teeth, peg-and-hole connections, connections in the form of prism-shaped projections and matching recesses, and rectangular lug-and-recess connections.

To obtain a very strong, dust-tight connection, it is highly advantageous to also provide the abutting edges of the transparent members forming the windows with interlocking teeth. It is of course also possible for just the transparent window members to have interlocking teeth.

Figure 2:
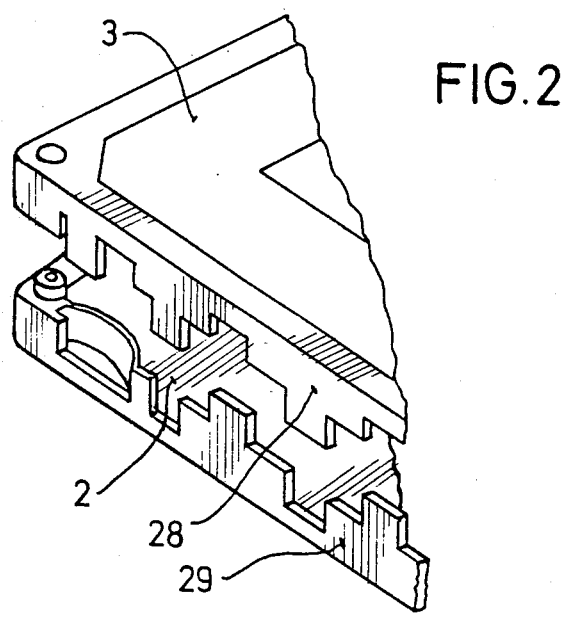
Figure 3:
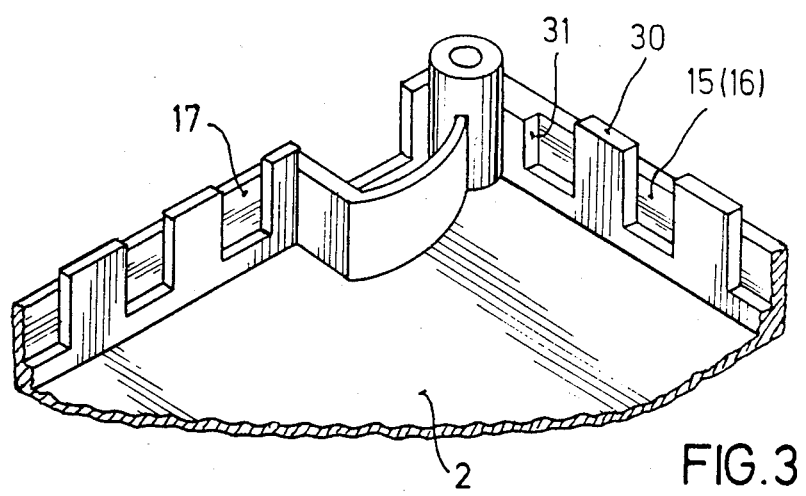
Figure 4:
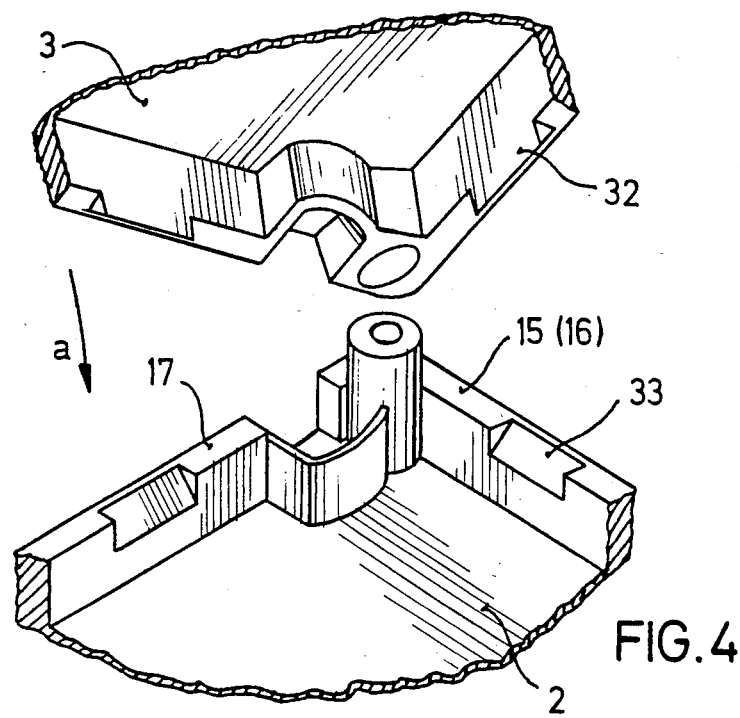
Figure 5:
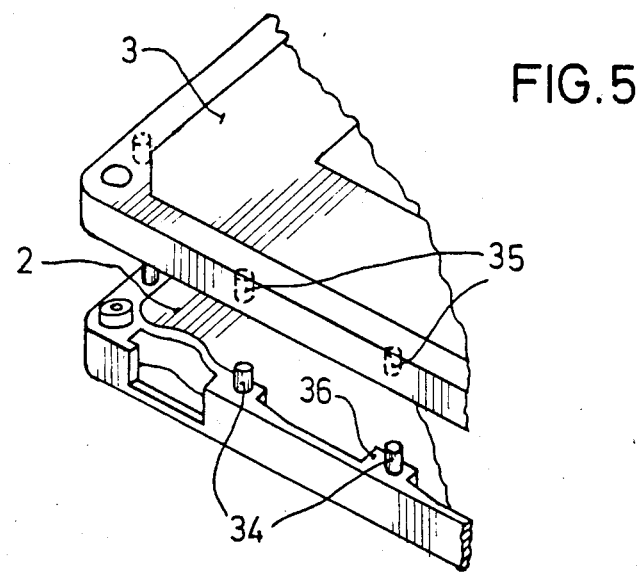
Figure 6:
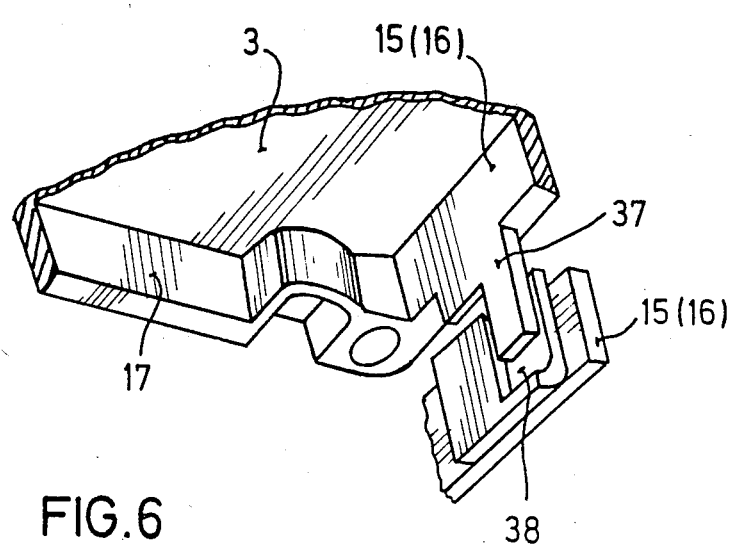
Figure 7:
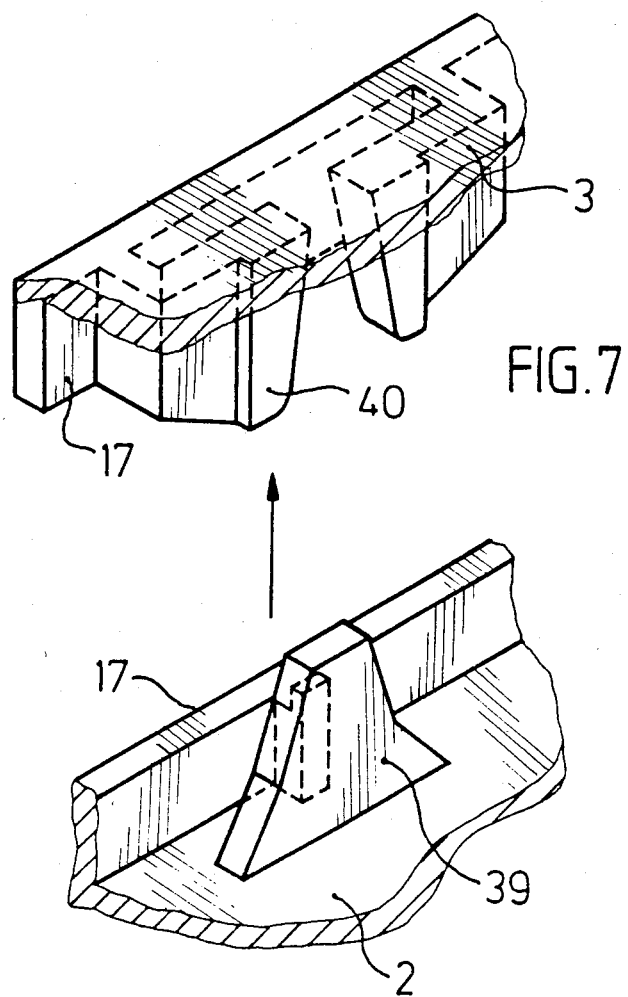

Further details of the invention are disclosed in the following description of the embodiments given by way of example and illustrated in the accompanying drawings, in which FIG. 1 is a perspective view of a compact cassette according to the invention, with two windows, FIG. 2 is a perspective view of the associated corners of the two parts of the novel cassette, showing connecting means in the form of interlocking stepped teeth, FIG. 3 is a perspective view of a corner of a cassette part having rectangular teeth which are set back relative to the outer surfaces of the wall sections, FIG. 4 is a perspective view of the associated corners of the two cassette parts which are shown in two different planes and whose wall sections are provided with prism-shaped projections and matching recesses respectively, FIG. 5 is a perspective view of the associated corners of the two cassette parts whose wall sections have peg-and-hole connections, FIG. 6 is a perspective view of two associated cassette parts whose wall sections are provided with rectangular lug-and-recess connections, and FIG. 7 is a perspective, fragmentary view of associated bottom and top parts having a single, essentially trapezoidal connecting system.

A compact cassette 5 consists essentially of a housing 4 with top and bottom parts 3 and 2, which are fastened together by means of, for example, screws (not shown). Apertures 9 and 10 serve to admit the apparatus-associated drive spindles. Behind apertures 9 and 10 are hubs 11 and 12, whose teeth 13 are also visible. Two window apertures 14a and 14b are arranged symmetrically with respect to the axis passing through the centers of hubs 11 and 12.

The inner edges of apertures 14a and 14b are semicircular, the diameter of the semicircle corresponding approximately to the outside diameter of hubs 11 and 12. Window apertures 14a and 14b extend linearly to the outer edges of the housing, i.e. as far as the short sides of the substantially rectangular housing. The window apertures 14 may be of any shape and arranged in any way, provided that the strength requirements placed on magnetic tape cassettes are met; this can be achieved by appropriate choice of the materials of construction. The window apertures 14a and 14b are covered by transparent members 18 which form the actual windows.

The transparent members 18 are provided with edge portions 24 which are bent up at right angles and have a height corresponding, for example, to half the height of the narrow sides of housing 4, so that, when the two housing parts 2 and 3, which have identical window arrangements, are put together, the sides of the cassette have the standardized height. Cassette 5 is provided with tape rolls 19 and 20, a magnetic tape 21 and tape guide levers 22 and 23.

Around apertures 9 and 10 in the windows, bearing rings, which are not visible, are provided for hubs 11 and 12. Housing 4 comprises the bottom and top walls 7 and 6, as well as side walls 15 and 16, rear wall 17 and front wall 25 with frame portions 26 which define the aperture 27 for the scanning means.

As shown in FIG. 1, the wall sections 15 (16) and 17 belonging to the top and bottom parts 3 and 2 have an interlocking tooth system 40—the shape of the teeth is discussed below—to impart greater flexural strength and torsional rigidity to housing 4, to enable the housing parts to be fitted together more accurately and thus to make the cassette less sensitive to mechanical stresses and changes in temperature.

Since housing 4 serves as a reference for the hub bearings and hence for tape roll alignment as well as for the tape guide elements of the cassette 4, the elimination of adverse mechanical or thermal effects ensures that the predetermined positions of the hubs, of the guide pins, of the frame portions defining aperture 27 and of the guide roller axes are maintained, with the result that optimum running of the tape and winding of the tape rolls is achieved. Furthermore, the outside of the housing 4 serves to position the cassette 5 relative to one or more magnetic heads in the apparatus.

Adequate rigidity can be imparted to the cassette if only rear wall 17 is provided with interlocking teeth, but greater rigidity can be achieved if the side walls 15 and 16 or the front corner sections are provided with such teeth.

Referring now to FIG. 2, the two wall sections 28 and 29 are provided with stepped teeth, each projecting portion on part 28 being opposite a matching recess in part 29, and vice versa, thus forming a joint which leads directly into the interior of the housing. However, such a joint is acceptable for audio tape cassettes. The joint shown in FIG. 2 can have any desired meander shape, for example the rectangular meander shown in FIG. 3.

In FIG. 3, in contrast to FIG. 2, straight wall sections 15 (16) and 17 have been retained, and the rectangular teeth 30 and recesses 31 are arranged directly on the inner surface of these wall sections; the teeth and recesses in this embodiment form a meander joint only on the inside, so that this joint does not extend completely through the wall, but is covered on the outside by the wall sections. It is of course also possible to vary the length, width and thickness of the teeth 30 and to match the recesses accordingly; this variant is very advantageous.

FIG. 4 shows further connecting means consisting of prism-shaped projections 32 and matching recesses 33 which are provided on the wall sections 15 (16) and 17. Top part 3 is shown in perspective from below, and bottom part 2 in perspective view from above. Part 3 can be placed on part 2 in the direction indicated by arrow a, the projections and recesses 32 and 33 engaging one another. The resulting joint leads directly into the interior of the cassette only in the regions between the projections 32.

FIG. 5 shows corner portions of bottom and top parts 2 and 3. Here, the connecting means are in the form of pegs 34 on the lower wall section and corresponding holes 32 in the upper wall section. It is also possible to provide pegs 34 and holes 35 on ribs 36 which are integral with the wall sections; this design imparts additional strength to housing 4.

FIG. 6 shows further interlocking tooth system which consists of a rectangular lug 37 on the upper wall 15 (16) and a rectangular recess 38 in the lower wall 15 (16). The respective dimensions of the lug and recess are such that the edges of the wall sections abut when the cassette is closed. This rectangular tooth system also forms a joint which extend through the walls directly into the interior of the cassette only in a few peripheral regions.

FIG. 7 shows another connecting system comprising an essentially trapezoidal member 39 and a matching recess 40 which are provided on the bottom and top walls respectively, preferably in the middle of the rear wall 17. No further connecting systems are required in this embodiment, but it is of course possible to provide them, for example, in the middle of the side walls.

In practical experiments, in which the cassette was held in a clamp at one corner and the corner diagonally opposite was subjected to a load, it was found that, at a given load, all embodiments of the cassettes according to the present invention had at least twice the flexural strength and torsional rigidity of commercial compact cassettes of the applicant which were without the above-described connecting means. The cassettes which were tested consisted of commercial plastics material processed by injection molding.

The shapes of the connecting means described above are to be regarded as ideal examples; for the sake of simplicity, not all of the slopes, bevels, additional lugs and recesses that are possible in injection molding have been described but their use is readily apparent to one skilled in the art.

The embodiment shown in FIG. 1 in which the interlocking tooth system extends around the front corners into the front wall 25 is very advantageous, since it is particularly at the front of the cassette that bending or twisting has the greatest effect on tape/head alignment and hence directly results in recording and playback errors.

In principle, it is also possible to provide containers which have a shape other than rectangular, for example circular reel containers, with the same or similar interlocking connecting to impart flexural strength to them and to make them dust-tight.

We claim:

1. A magnetic tape cassette comprising at least one magnetic tape roll within an essentially right parallelpipedic, two-part housing consisting of a cover part and a bottom part which together have a bottom wall, a top wall, a front wall with apertures for scanning, and side walls and a rear wall, the front wall, the rear wall and the side walls consisting of wall sections which are at right angles to the bottom and top walls and abut one another in a substantially horizontal parting plane of said housing, said wall sections having interlocking connecting means, wherein as connecting means on the side surfaces of at least the wall sections forming the rear wall there are provided a series of teeth on each of the bottom part and the cover part, said teeth being integral with said sections, whereby in the closed housing each tooth on one of said wall sections is engaged in an opposite matching recess on the opposite wall section, said teeth and recesses being in the form of prism-shaped projections which are triangular in cross-section, and matching recesses, the inclined side of the triangle being at an angle to the plane of the tape cassette, and wherein the end faces of both the teeth and the matching recesses are disposed in horizontal planes oppositely spaced from the horizontal parting plane of the housing so that straightthrough communicaton in any of said horizontal planes at the location of said teeth and recesses is avoided.

2. A magnetic tape cassette comprising at least one magnetic tape roll within an essentially right parallelpipedic, two-part housing consisting of a cover part and a bottom part which together have a bottom wall, a top wall, a front wall with apertures for scanning, and side walls and a rear wall, the front wall, the rear wall and the side walls consisting of wall sections which are at right angles to the bottom and top walls and abut one another in a substantially horizontal parting plane of said housing, said wall sections having interlocking connecting means, wherein as connecting means on the side surfaces of at least the wall sections forming the rear wall there are provided a series of teeth of triangularly stepped shape on each of the bottom part and the cover part, said teeth being integral with said sections, whereby in the closed housing each tooth on one of said wall sections is engaged in an opposite matching recess on the opposite wall section, and wherein the end faces of both the teeth and the matching recesses are disposed in horizontal planes oppositely spaced from the horizontal parting plane of the housing so that straightthrough communication in any of said horiozontal planes at the location of said teeth and recesses is avoided.

* * * * *